(12) United States Patent
Park (10) Patent No.: US 7,798,446 B2
(45) Date of Patent: Sep. 21, 2010

(54) AIRCRAFT SEATING AND SEATING ARRANGEMENTS

(75) Inventor: James Park, London (GB)

(73) Assignee: Singapore Airlines Limited, Singapore (SG)

( * ) Notice: Subject to any disclaimer, the term of this patent is extended or adjusted under 35 U.S.C. 154(b) by 799 days.

(21) Appl. No.: 10/589,887

(22) PCT Filed: Feb. 17, 2005

(86) PCT No.: PCT/SG2005/000041

§ 371 (c)(1),
(2), (4) Date: Mar. 27, 2007

(87) PCT Pub. No.: WO2005/077758

PCT Pub. Date: Aug. 25, 2005

(65) Prior Publication Data

US 2007/0164157 A1    Jul. 19, 2007

(30) Foreign Application Priority Data

Feb. 18, 2004  (GB) ................... 0403627.3

(51) Int. Cl.
*B64D 11/06* (2006.01)
(52) U.S. Cl. .................. 244/118.6; 244/118.5
(58) Field of Classification Search .............. 244/118.6, 244/118.5, 122 R; 5/9.1
See application file for complete search history.

(56) References Cited

U.S. PATENT DOCUMENTS

| 5,425,516 | A | 6/1995 | Daines | |
|---|---|---|---|---|
| 7,178,871 | B1 * | 2/2007 | Round et al. | 297/244 |
| 7,419,214 | B2 * | 9/2008 | Plant | 297/245 |
| 7,517,010 | B2 * | 4/2009 | Saint-Jalmes et al. | 297/118 |
| 7,578,470 | B2 * | 8/2009 | Plant | 244/118.6 |
| 7,578,471 | B2 * | 8/2009 | Beroth | 244/118.6 |
| 2002/0017810 | A1 | 2/2002 | Dryburgh et al. | |
| 2003/0080597 | A1 | 5/2003 | Beroth et al. | |
| 2005/0067870 | A1 * | 3/2005 | Rezag et al. | 297/354.13 |
| 2005/0087650 | A1 * | 4/2005 | Quan et al. | 244/118.6 |
| 2009/0146005 | A1 * | 6/2009 | Bettell | 244/118.6 |

FOREIGN PATENT DOCUMENTS

EP    0 957 025 A2    11/1999

(Continued)

OTHER PUBLICATIONS

Supplementary European Search Report corresponding to EP 05711199 dated, Jul. 27, 2009.

*Primary Examiner*—Christopher P Ellis
(74) *Attorney, Agent, or Firm*—Sughrue Mion, PLLC (57) ABSTRACT

A seat (20) for a commercial aircraft capable of conversion to a sleeping configuration, comprises a seat back (26), a seat base (22) and a leg rest mounted within a seat shell, comprising side members (12, 14) and a back shell part (10) the rear surface of the back shell (10) defining a recess (34) for the head, and a moulding (32) defining a second recess for the feet of the passenger behind. The seat back (26) is foldable over the seat base (22) to form the main supporting surface (31) of the bed configuration. The second recess in the seat (20) requires the passenger to lie in a diagonal sleeping position, maximising the available bed length within a minimum seat pitch.

12 Claims, 6 Drawing Sheets

FOREIGN PATENT DOCUMENTS

| | | | |
|---|---|---|---|
| GB | 2 362 095 A | 11/2001 | |
| GB | 2362095 A | 11/2001 | |
| GB | 2438162 A * | 11/2007 | |
| WO | WO 96/18537 A1 | 6/1996 | |
| WO | 03013903 A | 2/2003 | |
| WO | WO 03/013903 A1 | 2/2003 | |
| WO | WO 2005/014395 A1 | 2/2005 | |
| WO | 2007061381 A | 5/2007 | |

* cited by examiner

AIRCRAFT SEATING AND SEATING ARRANGEMENTS

This invention relates to aircraft seating and seating arrangements. The invention is particularly, but not exclusively, applicable to seating for commercial aircraft.

It is becoming increasingly necessary for airlines to install a seat that converts into a bed at least in first class on long haul flights. The conflicting commercial considerations are the provision of a good service, on the one hand, and the cabin occupancy density and weight considerations, on the other. Thus, it has become the goal of the seat designer to make as much use of as little space as possible while providing the necessary level of space and comfort expected in first and business class.

To this end, it is a common practice to arrange the seats in a chevron or overlapping arrangement so that they are effectively stacked to some extent. The typical seat is electrically driven between a seat configuration and a bed configuration by moving the seat components in line so that the seat back slides down to form the head of a bed and the seat base is displaced to a forward position to support the thighs. A leg and foot supporting portion of the bed is deployed either in conjunction with the leg rest portion of the seat or by means of a complementary platform which the seat base extends towards when configuring itself into a bed. An example of such a seat is disclosed in W096/18537, the disclosure of which is incorporated herein by reference.

W003/013903, the disclosure of which is incorporated herein by reference, discloses a bed which is carried out by means of the seat back rotating about its lower end to become inverted, rather than being slid into place, to form a corresponding part of the bed.

The common trait in the prior art is to overlap the seats either permanently or as beds. This overlapping is usually by orientation in a common horizontal plane, to define the chevron arrangement referred to above. However it can be vertically arranged so that the feet of a rear passenger rest underneath the head of the passenger in front. The chevron arrangement means each seat is disposed across the line which the arrangement of seats follows. Thus, the effective width taken up by each seat is increased. The vertical overlapping is less costly in width, but is far less acceptable to passengers as it means that each bed has to be sloped at an angle that is not comfortable for sleeping.

There have been other proposed solutions to the space problem. One particular proposal was to configure the seats into a bunk bed arrangements so that the passengers were intended to lie fully one on top of the other. Another, more recent proposal was to arrange adjacent passengers to lie in opposite directions, i.e. head first and feet first, respectively, so that the seat shapes could be arranged to complement one another. While these proposals may achieve space savings, they have not proved universally popular with passengers.

In all cases it is, of course, necessary to allow a person of reasonable height (e.g. 1.93 m) to stretch out fully if it is to be considered a bed according to the likely expectations of first and business class passengers. To effect this, the overlapping concept is consistent in the prior art. However, the problem with the prior art is that it all requires a fully deployed bed to be about 1.95 m long.

The present invention is defined in some of its aspects in the accompanying independent claims. Some preferred features are recited in the dependent claims.

In one embodiment, the invention provides a seat unit for an aircraft cabin comprising a seat unit for an aircraft cabin comprising a seat base and a seat back arranged in front of a rear wall having first and second parts in its lateral extent, the first part being relatively closer to the seat base than the second part which thereby defines the inner recess in an inner surface of the wall.

The recess provides a space for the head of an occupant in a bed configuration such that the occupant is urged to lie at an angle across the seat.

Preferably, the first part also defines an outer recess in an outer surface of the wall toward the opposite side of the seat to the inner recess. By this arrangement the feet of an occupant of one seat can extend into the outer recess of the seat in front. Because the recesses are on opposite sides of the seat, the occupant is further urged to lie across the seat to some extent which saves space by allowing the overall length of the bed to be shorter than the length of passenger to be accommodated.

Thus, while the orientation of the seat may be conventionally 'in-line', the occupant is using the seat at an angle to gain full use of the available leg room.

In a particular embodiment, a plurality of seats is arranged 'in-line'.

Preferably, the inner or outer recess extends across approximately up to half, for example a third, of the width of the bulkhead. The recess may extend for the full height of the bulkhead or only a proportion of it, for example a third. The recess may be open to the floor or define a pocket in the bulkhead.

The seat back may be movable from a generally upright seat configuration to a reclined (e.g. horizontal) bed position either by forward rotation or other deployment.

Preferably, the seat unit includes an extension surface which is arranged or deployable to form an extension of the seat back as a bed surface in the bed configuration.

Preferably, the extension surface is arranged or deployable at least partly in the inner recess and/or the outer recess.

The invention can be put into practice in various ways, some of which will now be described by way of example with reference to the accompanying drawings in which.

Figure 1:
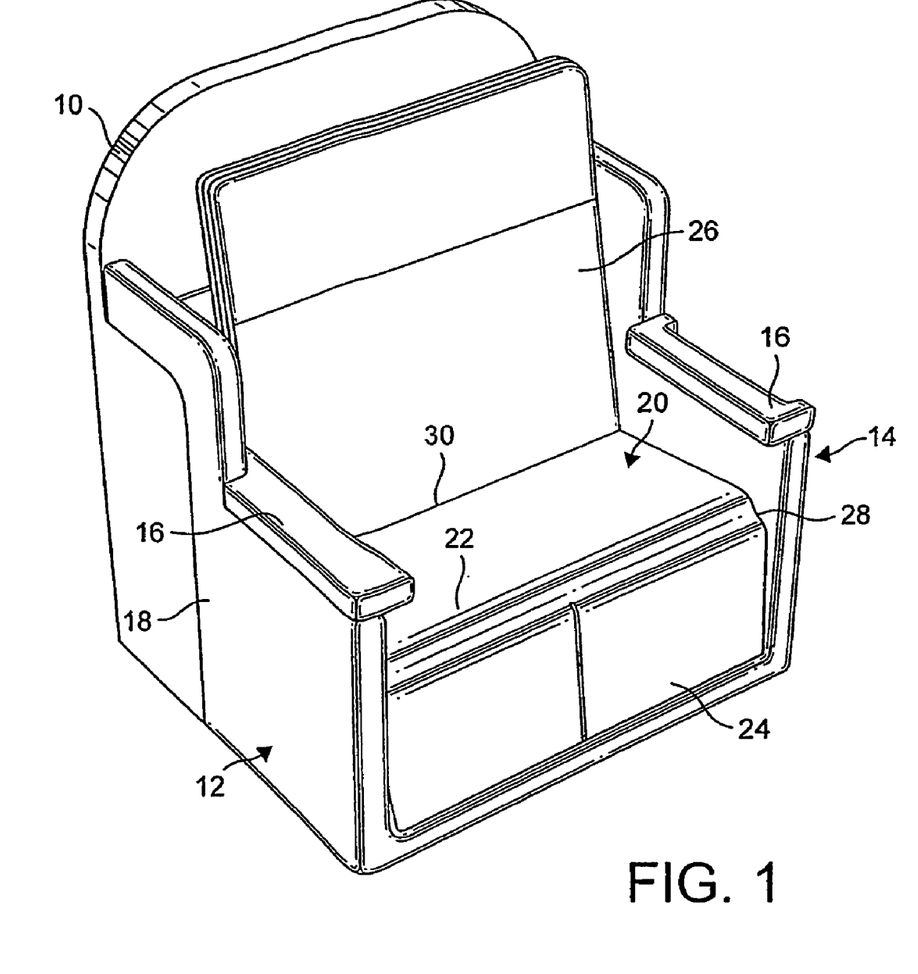
FIG. 1 is a perspective view of a first embodiment of seat for an aircraft.
Figure 3:
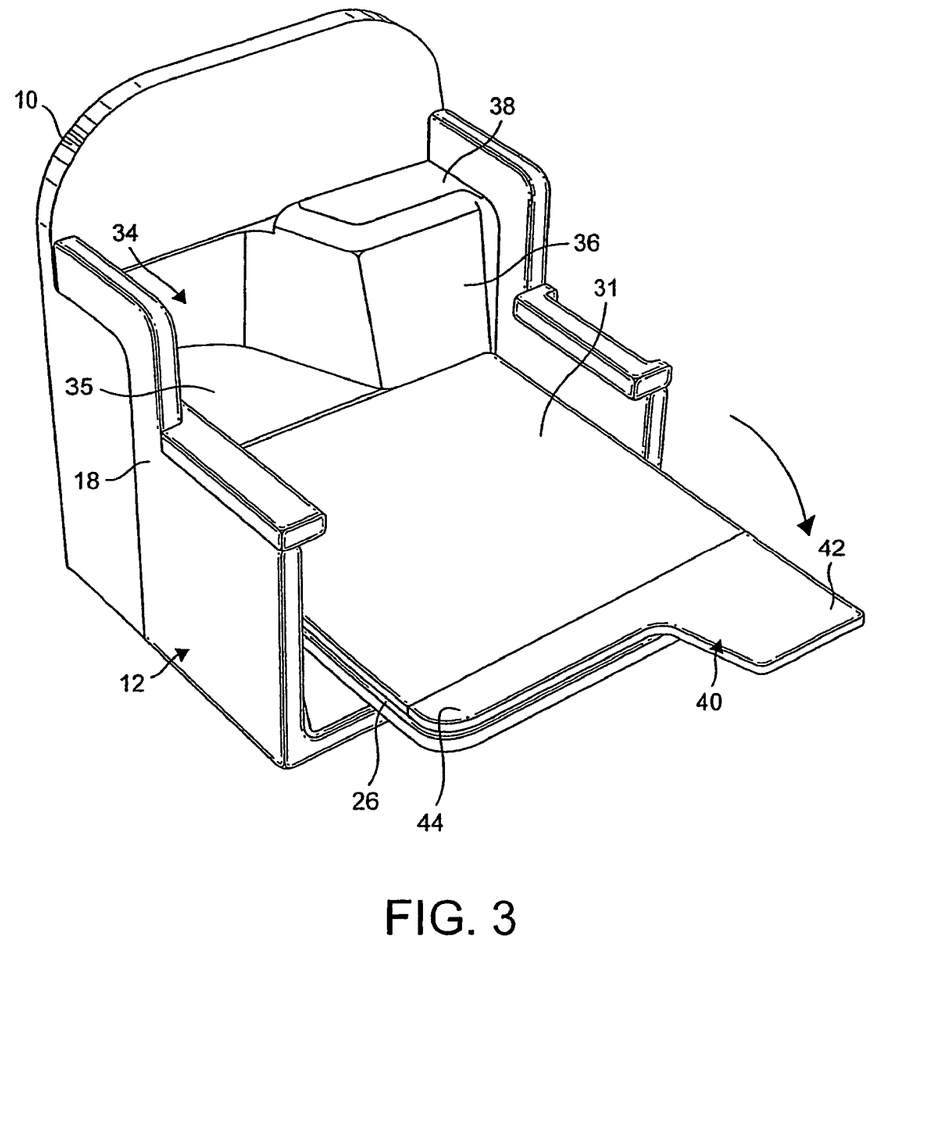
FIG. 3 is a third perspective view of the seat of FIG. 1.

Referring to FIGS. 1 and 3, a seat unit for an aircraft cabin comprises a back shell 10 and front side frame members 12 and 14 defining arm 16. In this embodiment, the side members comprise decorative cladding 18 that covers a rigid frame that supports the constituent parts of a seat 20. The frame is made of a suitably rigid material such as aircraft grade aluminium (Duralumin or the like). The parts of the seat are a seat base 22, a leg rest 24 and a back rest 26. The seat base 22, in this embodiment, is arranged to slide longitudinally and/or to be adjustable for seat base angle according to passenger preference by means of slots formed in each of the side frames 12/14 in which the parts of the seat ride. Likewise, the seat back rest 26 is adjustable as part of a seat configuration.

In this case, conventional manual or electrically motorized slide mechanisms can be used, as are known from conventional seats of this type. The leg rest 24 is also conventional being either manually, pneumatically or electrically deployable. It is pivotably mounted at a point 28 at or near the front of the seat base 20. However, unlike previous seat/bed arrangements known to the inventor, the leg rest 24 plays no part in the bed configuration in this embodiment.

The seat back 26 is mounted to pivot at a point 30 about or near its junction with the seat base 22 to fold forward on top of the seat base 22. As with the seat base, the seat back 26 is mounted for slidable movement between the two side frame members 12 and 14. The leg rest 24 is mounted on the front seat base 22, as described. The side frame members 12 and 14 are spaced by cross pieces at suitable locations both to provide rigidity for the structure and to mount components such as the actuating mechanisms for movement to the seat components that are supported between the side frames 12 and 14.

FIG. 1 shows this embodiment of the seat in a seat configuration. The set base 22 is slid back, the back rest 26 is upright and the leg rest 24 is stowed against the seat. This is essentially the familiar 'take-off and landing' configuration of the seat.

Figure 2:
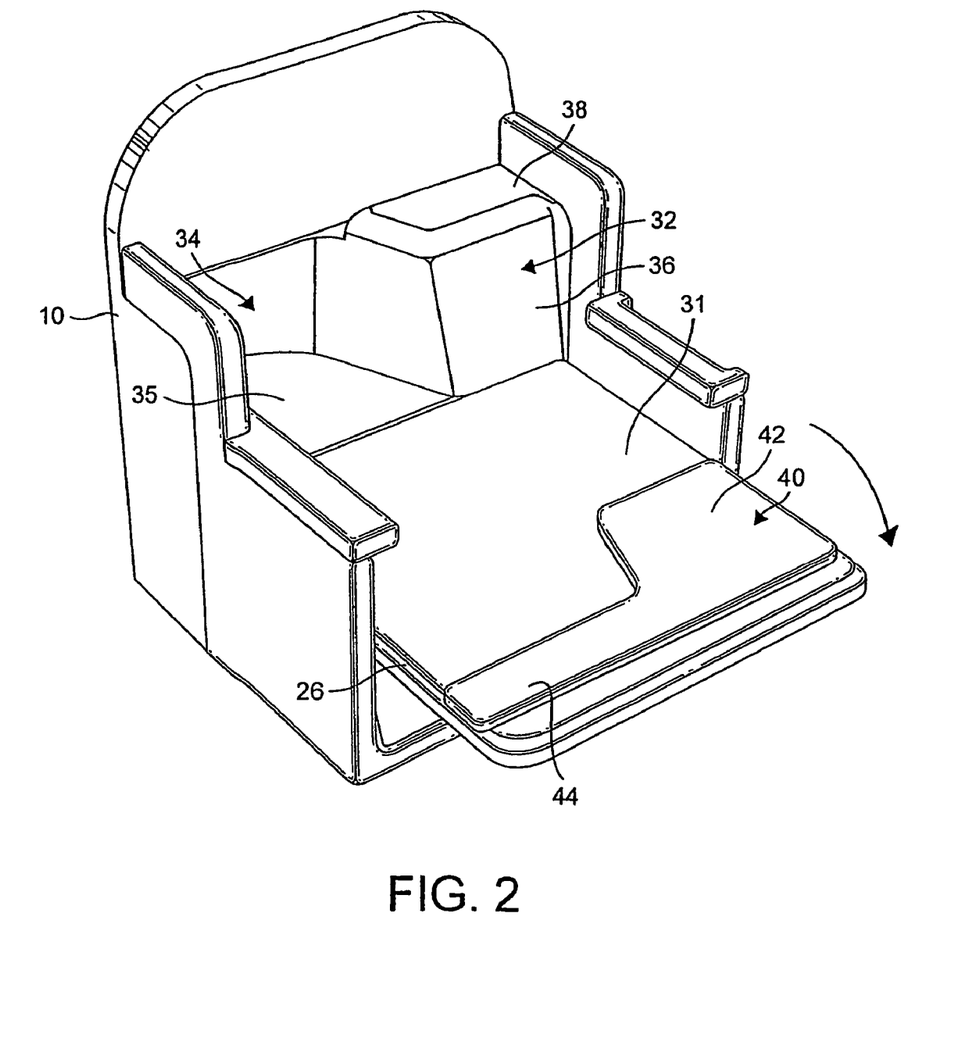
FIG. 2 is a second perspective view of the seat in FIG. 1.

FIG. 2 shows the same seat with its back rest 26 folded forwards on top of the seat base 22 in a bed configuration. It will be seen that the folded seat back 26 now forms part of the flat bed surface by means of its opposite side 31 from that used in the seat configuration so that it defines part of a bed surface in the bed configuration. The folded seat back 26 reveals a moulding 32 behind it formed in the back shell 10 that occupies approximately half the lateral width behind the seat back. The rest of the space 34, laterally to one side of the moulding 32, is a void which is delimited to the rear by the front of the back shell 10. The space 34 is filled by an extension surface 35 at the head end of the seat in the bed configuration. The shape 32 defines a flat front surface 36 against which the seat back 26 rests in the upright seat configuration. The top 38 of the shape is a flat surface for items required by a passenger during the night when the seat is arranged in the bed configuration.

The seat back 26 has a flat extension flap 40 mounted towards its top end (in the seat configuration—forward end in the bed configuration) by hinges (not shown). The extension flap 40 has a first portion 42 which is of a greater length than the adjacent portion 44 which is cut away to accommodate the seat in front, as will be described below.

The extension surface 35 adjacent the protruding moulding 32 in the back shell is lined with a cushioning material. Likewise, the front and rear of the seat back are lined with a cushioning material for their respective roles supporting the occupant whether seated or lying down.

As can be seen from FIG. 3, the extension flap 40 can be rotated to be deployed to complete the length of the bed. Again, the upper surface of the deployed flap 40 is lined with a cushioning material as it also forms part of the bed in the bed configuration.

In this embodiment, the seat is deployed as a bed simply by folding the seat back 26 forward over the seat base 12, and folding the flap 40 outwardly. The folded-out seat back lies in substantially the same plane as the surface 35 and the upper surface of the deployed extension flap 40.

Figure 4A:
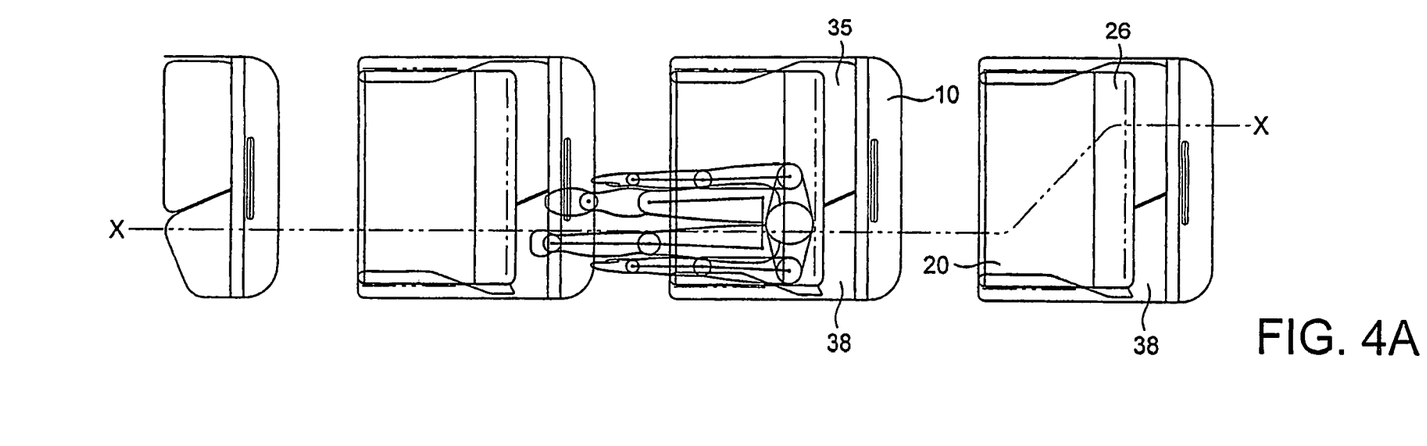
FIGS. 4A and B are plan and side views, respectively, of a line of seats in a seat configuration.

FIGS. 4A and B, 5A and B, 6A and B illustrate the context of the seat as one of an arrangement of seats in a commercial airline cabin. As described above, the seat is intended for use primarily in a cabin of a commercial aircraft. Prior art efforts to realize an appropriately sized bed have resorted to various relative arrangements of seats to overlap by orientating them out of the normal line of the seats and/or angling them so that they stack at least partially one on top of the other. It has proved to be the case that the preferred seating arrangement in an aircraft cabin is the traditional inline arrangement, i.e. with one seat behind the other, following the line of the aircraft, and with as little stacking as possible between beds. This embodiment allows the conventional in-line seating to be used at a reasonable seat pitch or spacing without compromising bed length.

FIGS. 4A and B show the seat in the take-off and landing upright configuration. The line XX in FIG. 4A denotes the section shown in FIG. 4B. The seat back 26 is arranged at an angle of 100° to the horizontal, i.e. substantially upright, resting against the front 36 of the projecting moulding 32. The extension flap 40 is stowed behind the seat back. The leg rest 22 is tucked under the seat base 20.

Figure 4B:
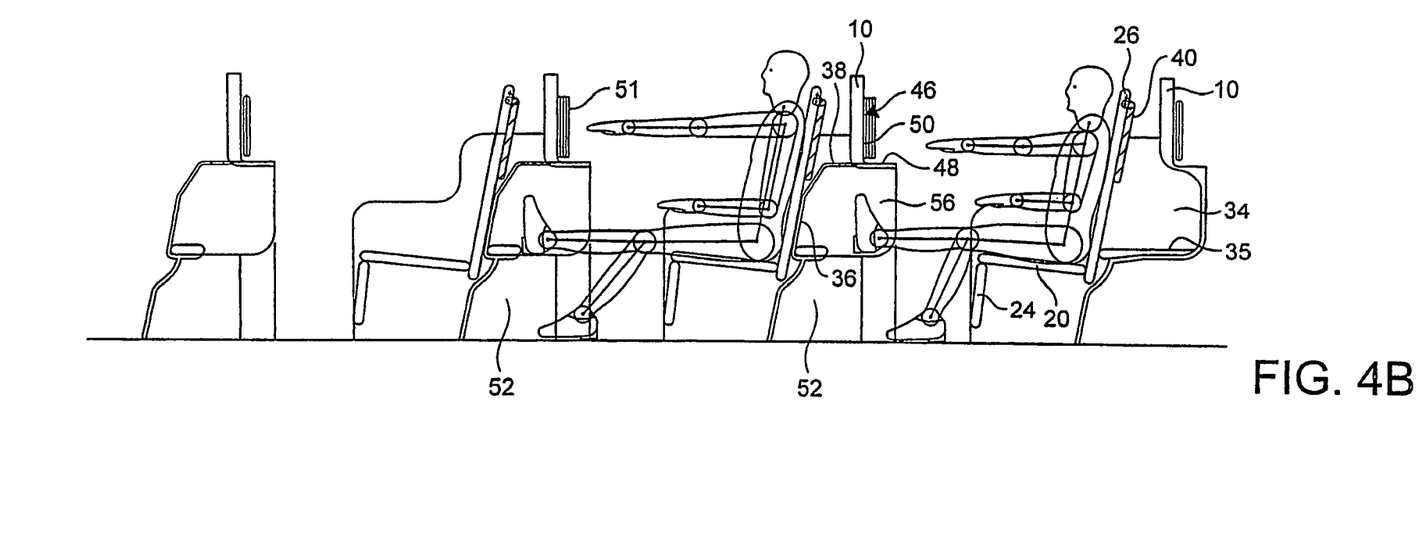

The outer surface of the back shell 10 also forms a fascia 46 for the seat behind. The fascia 46 comprises a shelf 48 and a facing wall 50 supporting a monitor 51 for watching videos. The wall 50 also serves to screen off the back of the seat in front so that the facing passenger is substantially unaware of the movements of the passenger in front, The maximum leg room for the passenger is on the side of the seat opposite the projecting moulding 32 of the seat in front as this defines a lower recess 52 for the passenger's legs. This is described below.

Figure 5A:
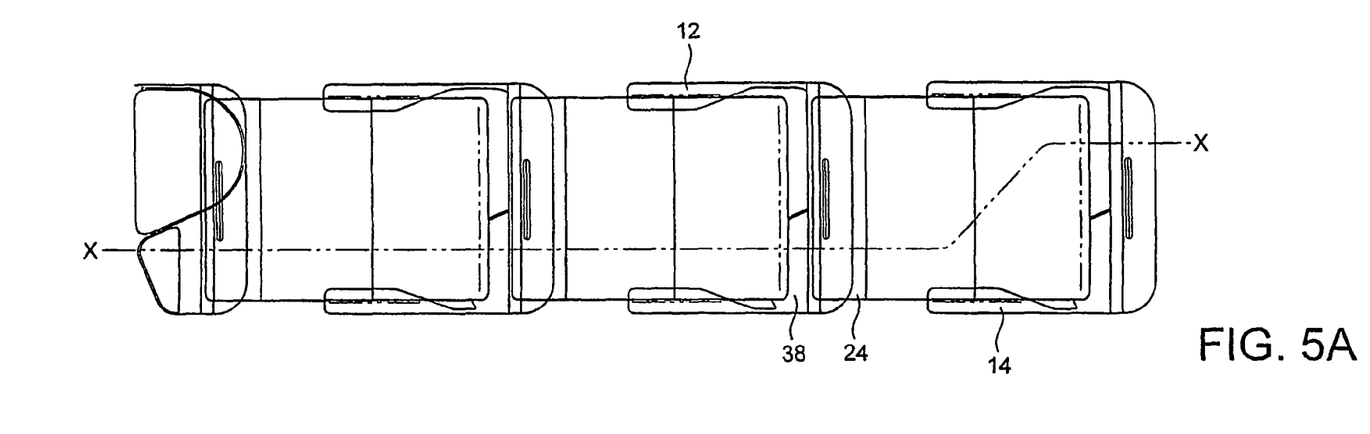
FIGS. 5A and B are plan and side views, respectively, of the line of seats in a reclined configuration.

Referring to FIGS. 5A and B, the seats are shown in a reclined seat configuration. The line XX in FIG. 5A denotes the section shown in FIG. 5B. The interval between seats is adequate for normal sitting with the leg rest deployed. The seat back 26 is reclined to an angle of 130°. To accommodate this the seat base 20 has been slid forwards together with the base of the seat back 26. To maximize the space in front of the passenger at ground level, the back shell 10 defines an inwardly sloping lower skirt 54 which simply intrudes in the space beneath the seat in front to define a lower outer recess 52. Thus, it has no impact on the space available to the passenger in front.

Figure 5B:
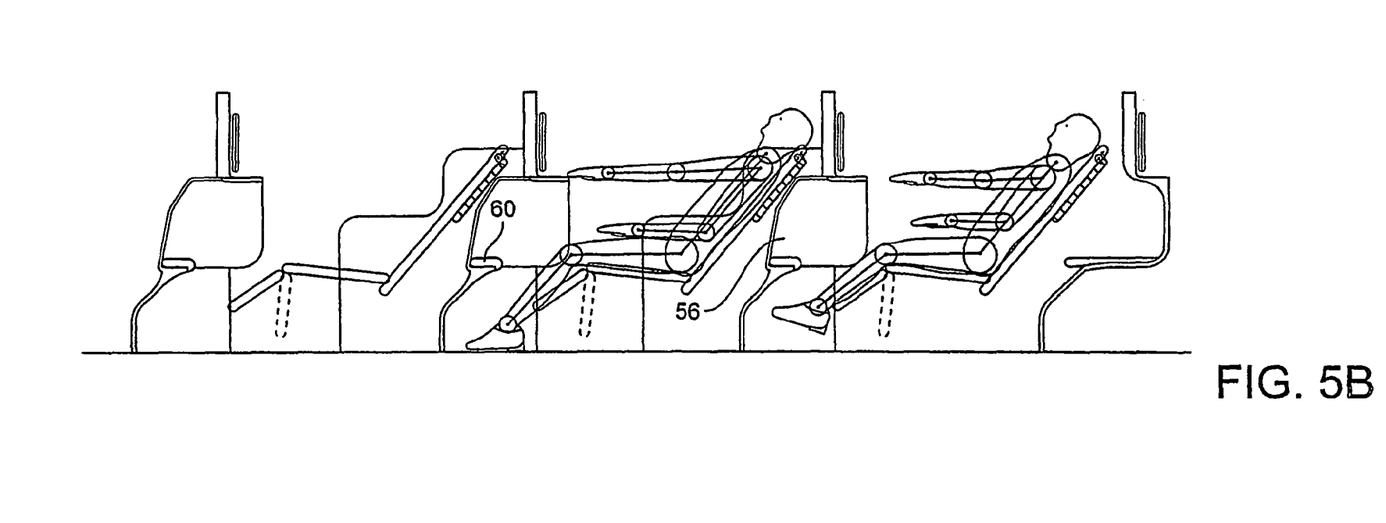

It will be seen that the moulding 32 also forms a corresponding upper outer recess 56 for the feet of the passenger in the seat behind. This is not utilised with the seat in the reclined position as the leg rest 24 does not deploy to the same attitude as the seat base 20. However, the recess 56 becomes an integral part of the bed configuration as discussed below.

Figure 6A:
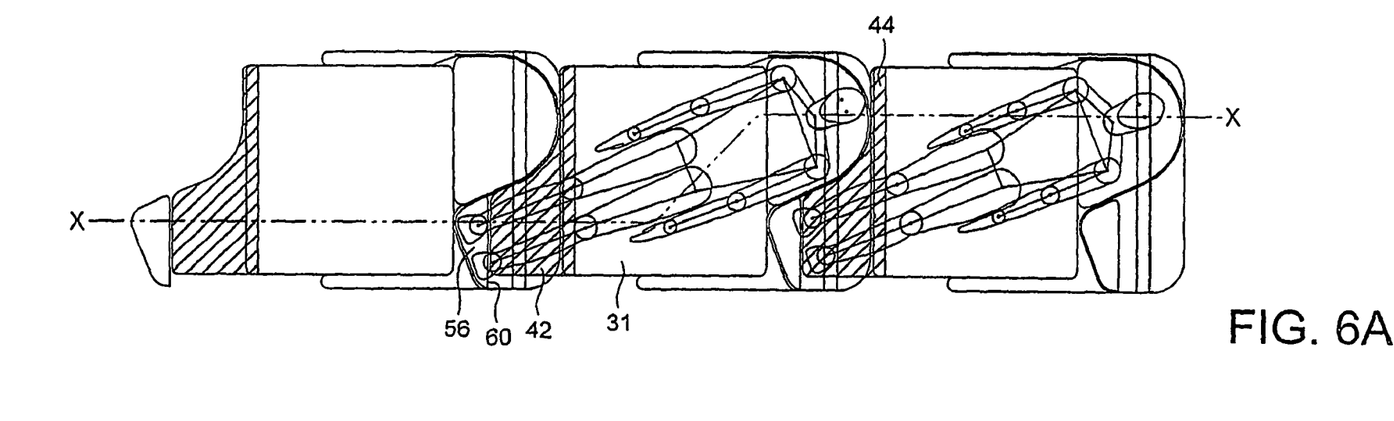
FIGS. 6A and B are plan and side views, respectively, of the line of seats in a bed configuration.

Now referring to FIGS. 6A and B, the seat is shown in the full flat bed configuration. Again, the line XX in FIG. 6A denoted the section in FIG. 6B. The seat back 22 is now rotated forwardly over the seat base 20, as previously described. The extension flap 40 is deployed forwardly. The longer part 42 of the flap 40 extends into the recess 56 of the seat in front. The shorter part 44 of the flap 40 fits around the back of the seat in front. The end of the longer part 42 of the flap 40 meets a small cushion surface 60 in the back of the recess 56 to complete the length of the bed. Thus, the bed area occupies all the available space across a plane at the height at which the bed is arranged. However, it will be noted from FIG. 6A that the useful area of the bed extends diagonally from the extension surface 35 in the inner recess 34 behind the folding seat back 26, adjacent the moulding 32, to the front of tie upper outer recess 56. This arrangement of the seats in a line still provides fully 1.93 m of bed length in a row of seats with a pitch between seats of 1.397 m.

Figure 6B:
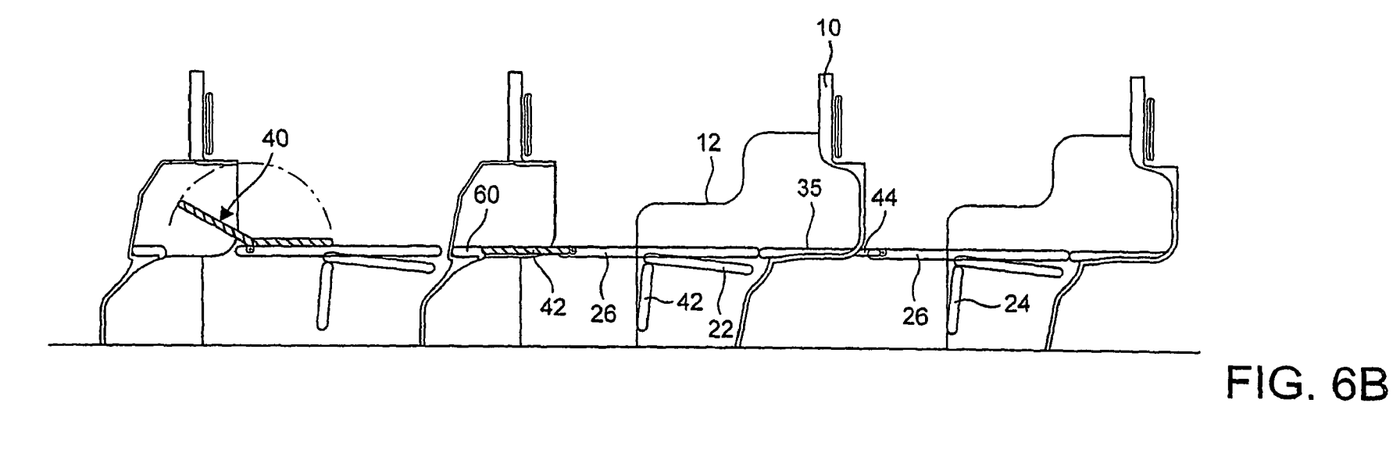

The upper outer recess 56 serves both to accommodate the feet of the passenger in the seat behind, and to help determine the orientation of the passenger when the seat is in the bed configuration. The seat arrangement makes use of a full length bed while still having a substantial seat in a relatively short pitch.

While this embodiment can be arranged to have motorized movement, it is equally possible to arrange the seat parts to be moved manually. This reduces the weight of the seat considerably which is a prime consideration in commercial aircraft Alternatively, the seat reclining mechanism can be motorized, as would be expected in a high specification aircraft cabin, but the rotation of the seat parts between the seat and bed configurations can be manual. This is particularly advantageous in the described embodiment because the reconfiguration of the seat into a bed is not simply a further progression from the sliding movement of the seat. It is a separate and distinct set of seat movements having no intermediate position requirements.

The invention claimed is:

1. A seat unit for an aircraft cabin having a longitudinal direction, comprising:
 a back shell,
 a seat base, and
 a seat back,
 wherein the seat back is mounted to pivot at a junction with the seat base and is foldable at the junction between an upright seat position and a fold-forward bed position in which the seat back lies on top of the seat base, and
 wherein the back shell includes a first part that defines an inner recess for at least a head of a passenger in the seat unit and a second part that defines an outer recess for the feet of a passenger behind the seat unit, wherein the first part and the second part are adjacent each other in a lateral direction and the second part is relatively closer to the seat base than the first part in a longitudinal direction.

2. A seat unit as claimed in claim 1 in which the seat back is movable between the upright seat position in which a first surface thereof is arranged to be part of a seat, and the fold-forward bed position in which a second, opposite, surface thereof is arranged to be part of a bed.

3. A seat unit as claimed in claim 1 in which a bed extension surface is arranged in the inner recess, which bed extension surface is adjacent the seat back in the fold-down bed position thereof to define a substantially flat bed surface with the seat back in the fold-down bed position.

4. A seat unit as claimed in claim 1 in which the seat back includes an extension piece disposed toward a top end thereof and extendable away from the seat base, the extension piece being deployable when in the fold-forward bed position of the seat back to extend the bed surface forwardly.

5. A seat unit as claimed in claim 1 in which the outer recess is formed with an upwardly facing surface providing a further bed extension surface for a seat arranged behind the seat unit.

6. A seating arrangement comprising a plurality of seat units as claimed in claim 1, each seat having a notional longitudinal centre line which is substantially coincident with a notional line on which the seats are arranged.

7. A seating arrangement as claimed in claim 6 in which the inner recess in one seat is on the same side of the seat as the inner recess in the seat in front or behind.

8. A seating arrangement for an aircraft cabin, having a longitudinal dimension in a direction of aircraft travel that defines a line of the aircraft, comprising:
 at least two seat units, one seat unit being disposed in front of the other seat unit in the line of the aircraft, each seat unit comprising:
 a back shell having an inner surface and an outer surface,
 a seat base, and
 a seat back,
 wherein the seat back is mounted to pivot at a junction with the seat base and is foldable at the junction between an upright seat position and a fold-forward bed position in which the seat back lies on top of the seat base,
 wherein the back shell includes a first part that defines an inner recess for at least a head of a passenger in the seat unit and a second part that defines an outer recess for the feet of a passenger behind the seat unit, wherein the first part and the second part are adjacent each other in a lateral direction and the second part is relatively closer to the seat base than the first part in a longitudinal direction, and
 wherein each seat unit further including a bed extension surface arranged or deployable in front of the seat back in the fold-down bed position to cooperate with a corresponding surface in the outer recess of the back shell of the seat unit in front.

9. A seat unit as claimed in claim 1 in which the seat base and the seat back are mounted on seat frame members for slidable movement.

10. A seat unit as claimed in claim 4 in which the inner recess and the extension piece are disposed such that a passenger is oriented in a horizontal position at an angle to a longitudinal direction of the aircraft.

11. A seat unit as claimed in claim 8 in which the seat base and the seat back are mounted on seat frame members for slidable movement.

12. A seat unit as claimed in claim 8 in which the inner recess and the extension piece are disposed such that a passenger is oriented in a horizontal position at an angle to the line of the aircraft.

* * * * *